(12) United States Patent
Anderson et al.

(10) Patent No.: US 11,827,365 B2
(45) Date of Patent: Nov. 28, 2023

(54) DETECTION OF AIRCRAFT ICING CONDITIONS AND DISCRIMINATION BETWEEN LIQUID DROPLETS AND ICE CRYSTALS

(71) Applicant: Rosemount Aerospace Inc., Burnsville, MN (US)

(72) Inventors: Kaare Josef Anderson, Farmington, MN (US); Mark Ray, Burnsville, MN (US); Kent Allan Ramthun, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 274 days.

(21) Appl. No.: 17/503,724

(22) Filed: Oct. 18, 2021

(65) Prior Publication Data
US 2023/0118338 A1    Apr. 20, 2023

(51) Int. Cl.
*B64D 15/20*    (2006.01)
*G01N 21/3577*    (2014.01)
*G01W 1/00*    (2006.01)

(52) U.S. Cl.
CPC ......... *B64D 15/20* (2013.01); *G01N 21/3577* (2013.01); *G01W 1/00* (2013.01)

(58) Field of Classification Search
CPC ...... B64D 15/20; G01N 21/3577; G01W 1/00
See application file for complete search history.

(56) References Cited

U.S. PATENT DOCUMENTS

| | | | | |
|---|---|---|---|---|
| 6,069,565 A | * | 5/2000 | Stern | B64D 15/20 356/369 |
| 6,091,335 A | * | 7/2000 | Breda | B64D 15/20 340/580 |
| 6,819,265 B2 | | 11/2004 | Jamieson et al. | |
| 6,914,674 B1 | * | 7/2005 | Wang | G01N 21/538 356/438 |

(Continued)

FOREIGN PATENT DOCUMENTS

| | | |
|---|---|---|
| EP | 3783333 A1 | 2/2021 |
| GB | 2511344 A | 9/2014 |

OTHER PUBLICATIONS

Extended European Search Report for EP Application No. 22201347.6, dated Feb. 27, 2023, 11 pages.

(Continued)

*Primary Examiner* — Michael H Wang
(74) *Attorney, Agent, or Firm* — Kinney & Lange, P.A.

(57) ABSTRACT

A method of operating an optical icing conditions sensor includes transmitting a first light beam with a first transmitter and a second light beam with a second transmitter, thereby illuminating two illumination volumes. A first receiver receives the first light beam. A second receiver receives the second light beam. A controller measures the intensity of light received by the first and second receivers. The controller compares the intensities to threshold values and determines if either intensity is greater than the threshold values. The controller determines a cloud is present if either intensity is greater than the threshold values. The controller calculates a ratio of the intensities if a cloud is present. The controller determines, using the ratio, whether the cloud contains liquid water droplets, ice crystals, or a mixture of liquid water droplets and ice crystals.

19 Claims, 6 Drawing Sheets

(56) References Cited

U.S. PATENT DOCUMENTS

| | | | | |
|---|---|---|---|---|
| 7,370,525 | B1* | 5/2008 | Zhao | B64D 15/20 |
| | | | | 73/170.21 |
| 7,986,408 | B2* | 7/2011 | Ray | B64D 15/20 |
| | | | | 356/342 |
| 8,831,884 | B2* | 9/2014 | Ray | G01S 17/95 |
| | | | | 356/342 |
| 9,116,243 | B1* | 8/2015 | Brown | G01S 17/18 |
| 9,588,220 | B2* | 3/2017 | Rondeau | G01S 17/08 |
| 10,207,810 | B2 | 2/2019 | Anderson et al. | |
| 10,429,511 | B2* | 10/2019 | Bosetti | G01S 7/499 |
| 10,620,342 | B2 | 4/2020 | Essawy et al. | |
| 10,640,218 | B2* | 5/2020 | Baudouin | B64D 15/20 |
| 10,816,661 | B2* | 10/2020 | Ray | G01S 7/025 |
| 11,686,742 | B2* | 6/2023 | Naslund | B64D 43/02 |
| | | | | 356/28 |
| 2010/0110431 | A1* | 5/2010 | Ray | B64D 15/20 |
| | | | | 356/342 |
| 2011/0019188 | A1* | 1/2011 | Ray | B64D 15/20 |
| | | | | 356/342 |
| 2013/0103317 | A1* | 4/2013 | Ray | G01S 17/95 |
| | | | | 702/3 |
| 2013/0162974 | A1* | 6/2013 | Dakin | G01S 7/4818 |
| | | | | 356/28 |
| 2017/0268993 | A1* | 9/2017 | Anderson | G01N 15/0205 |
| 2017/0276790 | A1* | 9/2017 | Lodden | B64D 43/02 |
| 2018/0024270 | A1 | 1/2018 | Ray et al. | |
| 2021/0055422 | A1* | 2/2021 | Ray | G01S 17/95 |

OTHER PUBLICATIONS

K.J. Anderson, et al., "SLD and Ice Crystal Discrimination with the Optical Ice Detector", from SAE Technical Paper 2019-01-1934, 2019, doI:10.4271/2019-01-1934, Jun. 19, 2019, 10 pages.

Extended European Search Report for EP Application No. 22200843.5, dated Mar. 22, 2023, 8 pages.

M. D. Ray, et al., "Optical Detection of Airborne Ice Crystals and Liquid Water Droplets", from 1st AIAA Atmospheric and Space Environments Conference, Jun. 22-25, 2009, 15 pages.

Gueymard, C. A., "Spectral Circumsolar Radiation Contribution to CPV", CPV-6 Conf., Freiburg, Germany, Apr. 2010, 5 pages.

* cited by examiner

DETECTION OF AIRCRAFT ICING CONDITIONS AND DISCRIMINATION BETWEEN LIQUID DROPLETS AND ICE CRYSTALS

BACKGROUND

The present disclosure relates generally to optical sensors, and in particular to an optical icing conditions sensor for an aircraft.

It is desirable to enable an optical sensor to both detect potential icing conditions and discriminate between different types of icing conditions (such as between supercooled liquid water clouds and ice crystal clouds). Each icing condition can require particular safety processes to be enabled. However, some ice crystal discrimination methods are performed using short pulse width lasers, and these methods require high-speed, sensitive electronics to detect the cloud reflection signals generated by the short pulse width lasers.

SUMMARY

According to one aspect of the present invention, a method of operating an optical icing conditions sensor for an aircraft includes transmitting, with a first transmitter, a first light beam having a first wavelength through an optical window of the aircraft at a first transmitting angle relative to the optical window. The first light beam illuminates a first illumination volume. A second transmitter transmits a second light beam having a second wavelength through the optical window of the aircraft at a second transmitting angle. The second light beam illuminates a second illumination volume. A first receiver receives light at a first receiving angle relative to the optical window. The first receiver is configured to receive light having the first wavelength over a first receiver field of view, and the first receiver field of view overlaps with the first illumination volume at a first predetermined distance. A second receiver receives light at a second receiving angle. The second receiver is configured to receive light having the second wavelength over a second receiver field of view, and the second receiver field of view overlaps with the second illumination volume at a second predetermined distance. A controller measures a first intensity of light received by the first receiver. The controller measures a second intensity of light received by the second receiver. The controller compares the first intensity to a first threshold value. The controller compares the second intensity to a second threshold value. The controller determines that a cloud is present if either the first intensity is greater than the first threshold value or the second intensity is greater than the second threshold value. The controller calculates a ratio of the first intensity to the second intensity if the controller determines that a cloud is present. The controller determines, using the ratio of the first intensity to the second intensity, whether the cloud contains liquid water droplets, ice crystals, or a mixture of liquid water droplets and ice crystals. A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

According to another aspect of the present invention, an optical icing conditions sensor for an aircraft includes a first transmitter, a second transmitter, a first receiver, a second receiver, and a controller. The first transmitter is configured to transmit a first light beam having a first wavelength through an optical window at a first transmitting angle relative to the optical window. The second transmitter is located adjacent to the first transmitter and is configured to transmit a second light beam having a second wavelength through the optical window at a second transmitting angle. The first receiver is configured to receive light having the first wavelength at a first receiving angle relative to the optical window. The second receiver is located adjacent to the first receiver and is configured to receive light having the second wavelength at a second receiving angle. The controller is configured to measure a first intensity of light received by the first receiver. The controller is further configured to measure a second intensity of light received by the second receiver. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals. A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

According to yet another aspect of the present invention, a controller for an optical icing conditions sensor of an aircraft includes at least one processor, at least one memory unit, and at least one communication unit. The controller is configured to measure a first intensity of light received by a first receiver of the optical icing conditions sensor. The controller is further configured to measure a second intensity of light received by a second receiver of the optical icing conditions sensor. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

DETAILED DESCRIPTION

An optical icing conditions sensor detects clouds and determines whether the detected clouds consist of liquid water droplets, ice crystals, or a mixture of water droplets and ice crystals. The optical icing conditions sensor uses optical transmitters which emit two wavelengths of light and optical receivers to receive the emitted light, and measures the difference in scattering intensity at the two emitted wavelengths to determine whether liquid water droplets and/or ice crystals are present. Liquid water droplets will cause a distinct difference in scattering intensities at the two emitted wavelengths, while ice crystals will cause approximately the same scattering intensity at the two emitted wavelengths.

Figure 1:
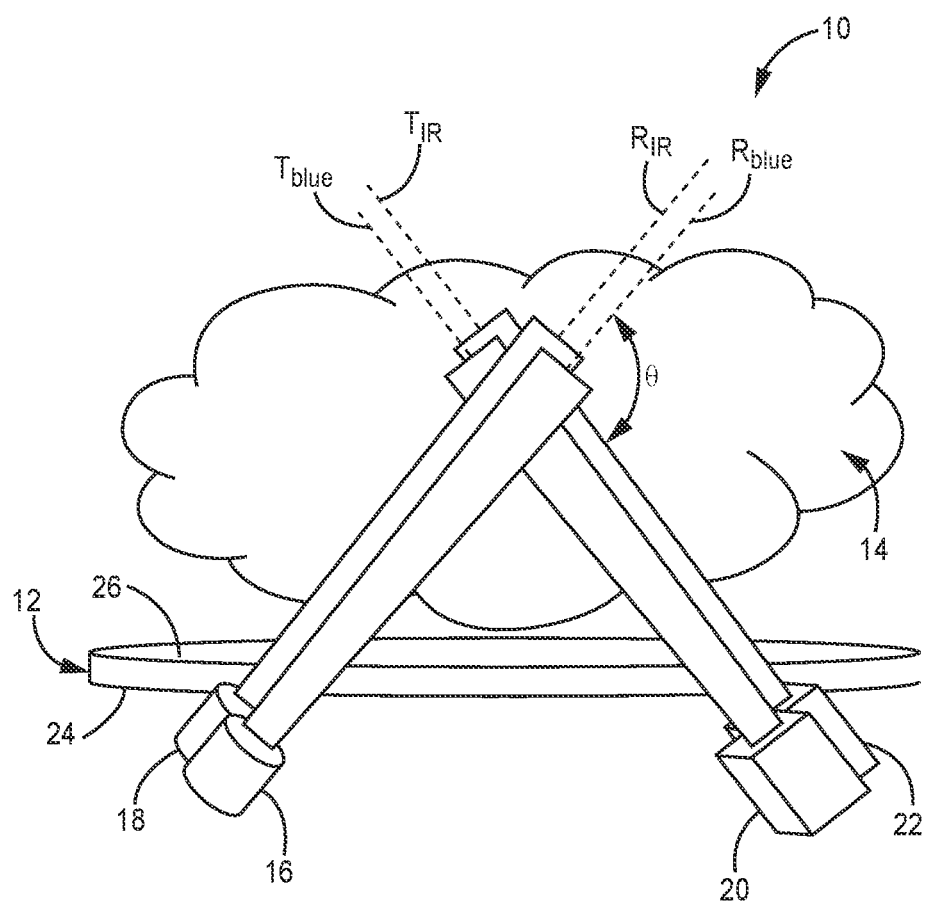
FIG. 1 is a schematic view of an optical icing conditions sensor.

FIG. 1 depicts optical icing conditions sensor (OICS) 10, optical window 12, and cloud 14. OICS 10 includes first transmitter 16, second transmitter 18, first receiver 20, and second receiver 22. OICS 10 can additionally include a controller, such as controller 100 (shown in FIG. 2). Optical window 12 can have inner surface 24 and outer surface 26.

Optical window 12 can be an optically transparent window, and which is located on a surface of an aircraft such that outer surface 26 contacts the air surrounding the aircraft. OICS 10 can be located adjacent to inner surface 24 of optical window 12 such that OICS 10 is within the aircraft. First transmitter 16 and second transmitter 18 can be optical transmitters. First transmitter 16 can be configured to transmit a light beam at a first wavelength, which can be in the range of blue visible light. For example, the first wavelength can be between 400 and 500 nanometers, and in particular can be 445 nanometers. Second transmitter 18 can be configured to transmit a light beam at a second wavelength, which can be in the range of infrared light. For example, the second wavelength can be between 800 and 1000 nanometers, and in particular can be 920 nanometers. First receiver 20 and second receiver 22 can be optical receivers. First receiver 20 can be configured to receive light at the first wavelength, and second receiver 22 can be configured to receive light at the second wavelength. The first wavelength and the second wavelength can be selected to have a difference in scattering intensities at a particular angle, and should therefore be wavelengths which are sufficiently far apart (in some examples, at least 300 nanometers apart) from each other that the two wavelengths will produce distinct scattering intensities at the selected angle. The first wavelength and the second wavelength can depend upon the selected transmitters and/or receivers. Second transmitter 18 can be located adjacent to first transmitter 16, and second receiver 22 can be located adjacent to first receiver 20.

First transmitter 16 is oriented along first transmitter path $T_{blue}$, such that first transmitter 16 emits a first light beam at the first wavelength along first transmitter path $T_{blue}$ during operation. First transmitter 16 emits the first light beam at a first transmitting angle defined by first transmitter path $T_{blue}$ and optical window 12. Second transmitter 18 is similarly oriented along second transmitter path $T_{IR}$, such that second transmitter 18 emits a second light beam at the second wavelength along second transmitter path Ti during operation. Second transmitter 16 emits the second light beam at a second transmitting angle defined by second transmitter path Ti and optical window 12. First transmitter 16 and second transmitter 18 emit their respective light beams at approximately equivalent transmitting angles.

First receiver 20 is oriented along first receiver path $R_{blue}$, such that first receiver 20 receives light at the first wavelength along first receiver path $R_{blue}$ during operation. First receiver 20 receives light at the first wavelength at a first receiving angle defined by first receiver path $R_{blue}$ and optical window 12. Second receiver 22 is similarly oriented along second receiver path $R_{IR}$, such that second receiver 22 receives light at the second wavelength along second receiver path $R_{IR}$ during operation. Second receiver 22 receives light at the second wavelength at a second receiving angle defined by second receiver path $R_{IR}$ and optical window 12. First receiver 20 and second receiver 22 receive light at approximately equivalent receiving angles.

During operation, the first light beam emitted by first transmitter 16 illuminates a first illumination volume in cloud 14. The first illumination volume is defined by the first light beam's diameter at an exit aperture of first transmitter 16 (not shown in FIG. 1) and the first light beam's divergence (increase in diameter) along first transmitter path $T_{blue}$. Similarly, the second light beam emitted by second transmitter 18 illuminates a second illumination volume in cloud 14. The second illumination volume is defined by the second light beam's diameter at an exit aperture of second transmitter 18 (not shown in FIG. 1) and the second light beam's divergence along second transmitter path $T_{IR}$. First receiver 20 has a first receiver field of view, and first receiver 20 is configured to receive light having the first wavelength over the first receiver field of view during operation. The first receiver field of view is defined by the size of first receiver 20 and the focal length of a receiver lens of first receiver 20 (not shown in FIG. 1). Second receiver 22 has a second receiver field of view, and second receiver 22 is configured to receive light having the second wavelength over the second receiver field of view during operation. The second receiver field of view is defined by the size of second receiver 22 and the focal length of a receiver lens of second receiver 22 (not shown in FIG. 1). OICS 10 is configured such that the first receiver field of view overlaps with the first illumination volume at a first predetermined distance, and the second receiver field of view overlaps with the second illumination volume at a second predetermined distance. Both the first predetermined distance and the second predetermined distance can be defined as the distance from outer surface 26 of optical window 12 at which the respective overlap occurs. In some examples, the first predetermined distance can be approximately equal to the second predetermined distance. The first predetermined distance and the second predetermined distance can each be between 2.5 inches (63.5 mm) and 12 inches (305 mm). These overlaps define detection volumes which allow first receiver 20 and second receiver 22 to receive light from first transmitter 16 and second transmitter 18 following reflection by water in cloud 14 (in the form of either liquid water droplets or ice crystals).

First transmitter path $T_{blue}$ and first receiver path $R_{blue}$ intersect at a distance from outer surface 26 of optical window 12. The intersection of first transmitter path $T_{blue}$ and first receiver path $R_{blue}$ forms a first reflecting angle. The intersection of second transmitter path $T_{IR}$ and second receiver path $R_{IR}$ forms a second reflecting angle. In the depicted embodiment, the first reflecting angle is approximately equal to the second reflecting angle, and for simplicity this angle will be referred to as reflecting angle θ. In the depicted embodiment, reflecting angle θ is approximately 136 degrees. Reflecting angle θ can have a tolerance of approximately ±1 degree. Reflecting angle θ can be selected such that light emitted along first transmitter path $T_{blue}$ can be reflected by liquid water droplets and/or ice crystals in cloud 14 and subsequently travel along first receiver path $R_{blue}$ to first receiver 20. Reflecting angle θ similarly allows light emitted along second transmitter path $T_{IR}$ to reflect from liquid water droplets and/or ice crystals in cloud 14 and travel along second receiver path $R_{IR}$ to second receiver 22. As described below, reflecting angle θ can be selected such that it is approximately a rainbow angle. During operation, reflecting angle θ can be defined as either the angle between the first light beam transmitted at the first transmitting angle and light received by first receiver 20 at the first receiving angle, or the angle between the second light beam transmitted at the second transmitting angle and light received by second receiver 22 at the second receiving angle.

As described below in more detail, first transmitter 16, second transmitter 18, first receiver 20, and second receiver 22 allow OICS 10 to discriminate between types of icing conditions present in clouds. Liquid water droplets in clouds exhibit scattering behavior which includes a peak at a particular "rainbow" angle, and the rainbow angle varies based on the wavelength of the incident light striking the water droplets. Ice crystals do not exhibit this scattering behavior, and an optical sensor (such as OICS 10) can be configured to discriminate between these behaviors to determine whether the cloud detected contains water droplets, ice crystals, or a combination of water droplets and ice crystals.

Figure 2:
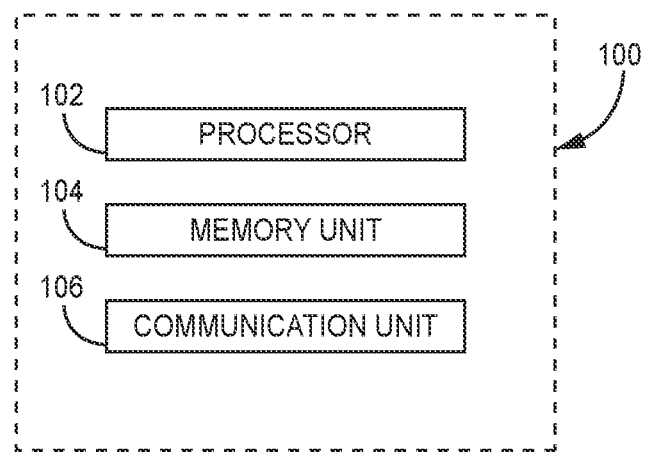
FIG. 2 is a schematic depiction of a controller for the optical icing conditions sensor of FIG. 1.

FIG. 2 is a schematic depiction of controller 100. Controller 100 can include processor 102, memory unit 104, and communication unit 106. In some embodiments, controller 100 can include multiple processors 102, memory units 104, and communication units 106. Controller 100 can additionally include more components, such as an input device, an output device, and/or a power source.

Processor 102 can be configured to implement functionality and/or process instructions for execution within controller 100. For example, processor 102 can be capable of processing instructions stored in memory unit 104. Examples of processor 102 can include any one or more of a microprocessor, a controller, a digital signal processor (DSP), an application specific integrated circuit (ASIC), a field-programmable gate array (FPGA), or other equivalent discrete or integrated logic circuitry. Instructions executed by processor 102 can cause controller 100 to perform actions, such as receiving and measuring input data from receivers within OICS 10, comparing these measurements to threshold values, and using these measurement comparisons to determine which type of cloud, if any, is present.

Controller 100 can also include memory capable of storage, such as memory unit 104. Memory unit 104 can be configured to store information (and/or instructions which may be executable by processor 102) within controller 100 during operation. Memory unit 104, in some examples, is described as a computer-readable storage medium. In some examples, a computer-readable storage medium can include a non-transitory medium. The term "nontransitory" can indicate that the storage medium is not embodied in a carrier wave or a propagated signal. In certain examples, a non-transitory storage medium can store data that can, over time, change (e.g., in RAM or cache). In some examples, memory unit 104 is a temporary memory, meaning that a primary purpose of memory unit 104 is not long-term storage. Memory unit 104, in some examples, is described as volatile memory, meaning that memory unit 104 does not maintain stored contents when power to controller 100 is turned off. Examples of volatile memories can include random access memories (RAM), dynamic random access memories (DRAM), static random access memories (SRAM), and other forms of volatile memories. In some examples, memory unit 104 is used to store program instructions for execution by processor 102.

Memory unit 104 can be configured to store larger amounts of information than volatile memory. Memory unit 104 can further be configured for long-term storage of information. In some examples, memory unit 104 includes non-volatile storage elements. Examples of such nonvolatile storage elements can include magnetic hard discs, optical discs, flash memories, or forms of electrically programmable memories (EPROM) or electrically erasable and programmable (EEPROM) memories.

Controller 100 can also include communication unit 106. Controller 100 can utilize communication unit 106 to communicate with devices via one or more networks, such as one or more wireless or wired networks or both. Communication unit 106 can be a network interface card, such as an Ethernet card, an optical transceiver, a radio frequency transceiver, or any other type of device that can send and receive information. For example, communication unit 106 can be a radio frequency transmitter dedicated to Bluetooth or WiFi bands or commercial networks such as GSM, UMTS, 3G, 4G, 5G, and others. Alternately, communication unit 106 can be a Universal Serial Bus (USB).

Controller 100 can include an input device, such as a presence-sensitive and/or touch-sensitive display, or other type of device configured to receive input from a user. Controller 100 can include an output device, such as a display device, a speaker, a liquid crystal display (LCD), a light emitting diode (LED) display, an organic light emitting diode (OLED) display, discrete switched outputs, or other type of device for outputting information in a form understandable to users or machines.

Controller 100 can be configured to receive and measure input data from receivers within OICS 10. For example, controller 100 can be configured to measure a first intensity of light received by first receiver 20, and can be additionally configured to measure a second intensity of light received by second receiver 22. Controller 100 can be further configured to compare measurements to one or more threshold values. For example, controller 100 can be configured to compare the first intensity to a first threshold value, and can be additionally configured to compare the second intensity to a second threshold value. Controller 100 can be further configured to use measurement comparisons to determine if a cloud is present. For example, controller 100 can be configured to determine that a cloud is present if either the first intensity or the second intensity exceeds the first threshold value or the second threshold value, respectively.

If controller 100 determines a cloud to be present, controller 100 can calculate a ratio of the first intensity to the second intensity. As described in more detail below, controller 100 can be further configured to determine, using this ratio, the type of cloud which has been detected (liquid water droplets, ice crystals, or a mixture of liquid water droplets and ice crystals). Controller 100 can be configured to communicate the type of cloud to another component of the aircraft, such as a display screen or a de-icing system. Controller 100 allows OICS 10 to discriminate between different types of icing conditions if a cloud (such as cloud 14 in FIG. 1) is detected in the vicinity of the aircraft.

Figure 3:
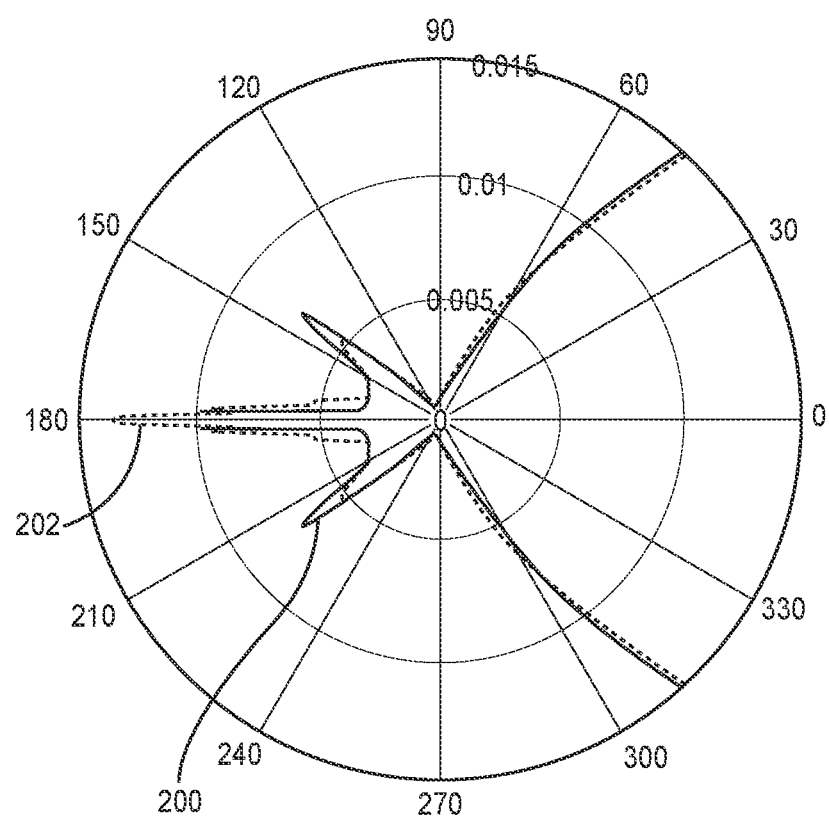
FIG. 3 is a polar plot of the scattering intensity of water droplets.

FIG. 3 is a polar plot of the scattering intensity of water droplets. In FIG. 3, the angular coordinates denote the angle of incident light (the angle at which light strikes a water droplet), and the radial coordinates denote the scattering intensity for each angle of incident light. Blue trend line 200 depicts scattering intensities at 445 nanometers, and infrared trend line 202 depicts scattering intensities at 920 nanometers. The scattering data displayed in FIG. 3 corresponds to water droplets having a median volumetric diameter (MVD) of 15 micrometers. The MVD is the droplet diameter below which, and above which, half of the cumulative water content in a cloud is contained. For example, a cloud having an MVD of 15 micrometers signifies that half of the water content in the cloud is contained in droplets which have a diameter of less than 15 micrometers, and the other half of the cloud's water content is contained in droplets which have a diameter greater than 15 micrometers. It should be understood that, while the scattering data for water droplets having MVD of 15 micrometers is shown here, water droplets having a different size will exhibit similar behavior (showing a scattering intensity peak).

When light illuminates liquid water droplets (such as those that make up a cloud), the water droplets have a scattering intensity which is dependent on the angle at which light illuminates the water droplets. For a range of angles, the water droplets have a corresponding range of scattering intensities. This range of scattering intensities will peak at approximately a rainbow angle. The rainbow angle will vary based on the wavelength of the light which is interacting with the water droplets. The rainbow angle has a tolerance of approximately ±1 degree. The intensity of light received by receivers (such as first receiver 20 and second receiver 22) can be compared against the predicted scattering intensity of light beams emitted by transmitters (such as first transmitter 16 and second transmitter 18).

As described above and in more detail below, ice crystals do not exhibit the same variation in scattering intensities across a range of angles. This difference in scattering behaviors allows for an OICS, such as OICS 10, to discriminate between clouds composed of ice crystals and clouds composed of liquid water droplets.

Figure 4A:
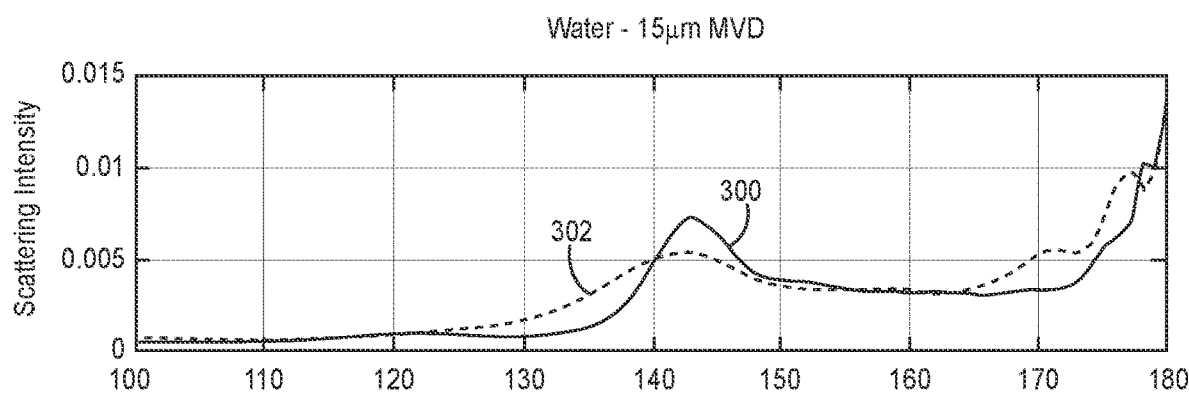
FIG. 4A is a graph of water droplets' scattering intensity for a range of scattering angles at wavelengths of 445 nm and 920 nm.
Figure 4B:
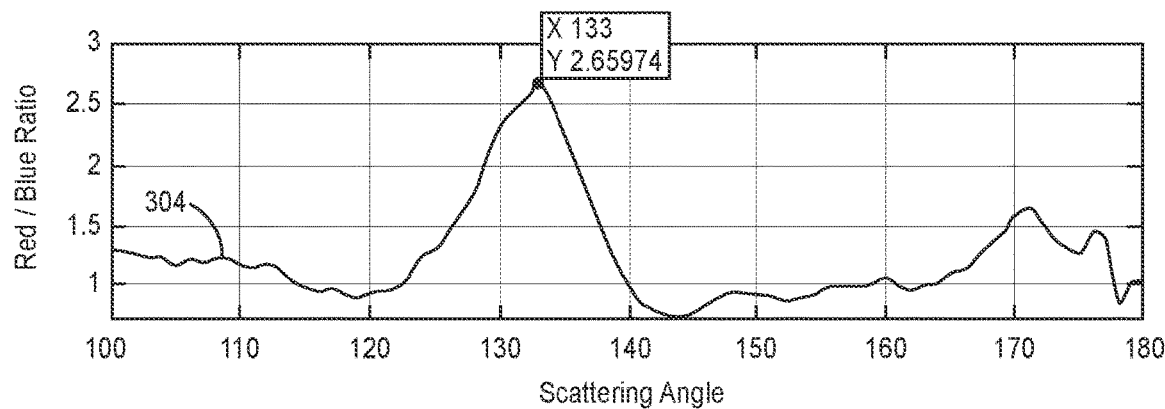
FIG. 4B is a graph of the ratio of the water droplet scattering intensities depicted in FIG. 4A.

FIG. 4A is a graph of water droplets' scattering intensity for a range of scattering angles at wavelengths of 445 nm and 920 nm. Blue trend line 300 depicts scattering intensities (in arbitrary units) at 445 nm, and infrared trend line 302 depicts scattering intensities at 920 nm. As described above in reference to FIG. 3, water droplets have a varying scattering intensity across a range of angles, with an approximate maximum scattering intensity at a rainbow angle. In FIGS. 4A and 4B (discussed below), the water droplets have MVD of 15 micrometers.

Blue trend line 300 and infrared trend line 302 exhibit similar behavior from 100 degrees to 180 degrees. Blue trend line 300 and infrared trend line 302 generally increase from approximately 120 degrees to approximately 145 degrees, decrease from approximately 145 degrees to approximately 165 degrees, and increase from approximately 165 degrees to 180 degrees. The maximum scattering intensity along blue trend line 300 is approximately 0.0075, and the maximum scattering intensity along infrared trend line 302 is approximately 0.005.

FIG. 4B is a graph of the ratio of the water droplet scattering intensities depicted in FIG. 4A. Ratio trend line 304 depicts the magnitude of the scattering intensity at 920 nm (shown by infrared trend line 302 in FIG. 4A) divided by the scattering intensity at 445 nm (shown by blue trend line 300 in FIG. 4A), from an angle of 100 degrees to an angle of 180 degrees. Ratio trend line 304 generally decreases from 100 degrees to approximately 120 degrees, increases from approximately 120 degrees to approximately 136 degrees, decreases from approximately 136 degrees to approximately 145 degrees, increases from approximately 145 degrees to approximately 170 degrees, and decreases from approximately 170 degrees to 180 degrees. The maximum ratio value along ratio trend line 304 is approximately 2.5. This variation in relative intensity (shown by ratio trend line 304), resulting in a peak, is caused by the scattering of light from spherical water droplets. As described in more detail below, ice crystals do not exhibit this same variation in relative scattering intensity, making it possible to discriminate between clouds containing water droplets and clouds containing ice crystals by measuring the relative intensity across a range of angle at two different wavelengths.

Figure 5A:
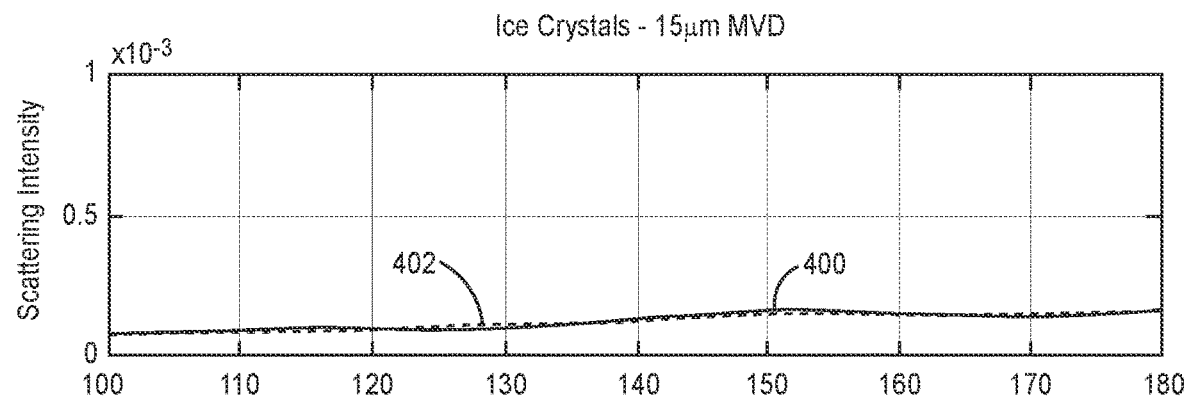
FIG. 5A is a graph of ice crystals' scattering intensity for a range of scattering angles at wavelengths of 445 nm and 920 nm.
Figure 5B:
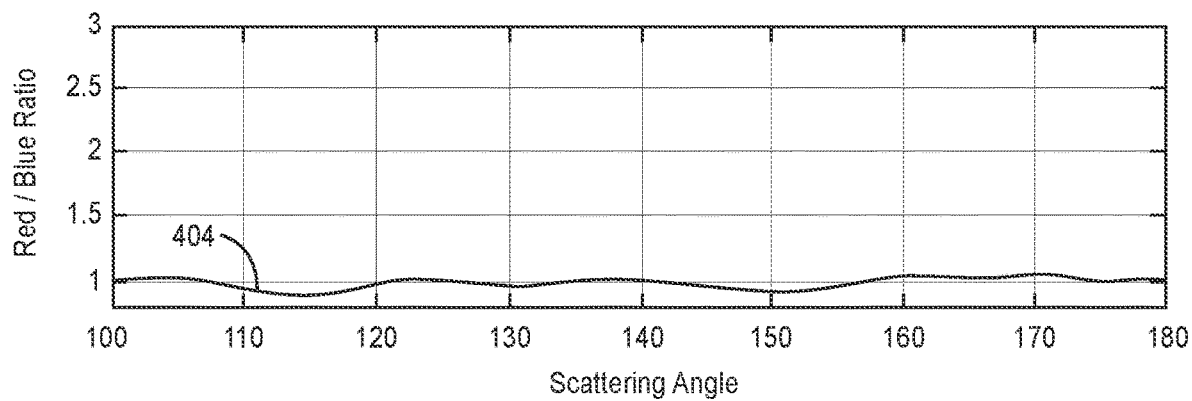
FIG. 5B is a graph of the ratio of the ice crystal scattering intensities depicted in FIG. 5A.

FIG. 5A is a graph of ice crystals' scattering intensity for a range of scattering angles at wavelengths of 445 nm and 920 nm. FIG. 5B is a graph of the ratio of the ice crystal scattering intensities depicted in FIG. 5A. FIGS. 5A-5B will be discussed together.

In FIG. 5A, blue trend line 400 depicts scattering intensities at 445 nm, and infrared trend line 402 depicts scattering intensities at 920 nm. Blue trend line 400 and infrared trend line 402 exhibit the same trend behavior and have approximately the same magnitude along the displayed range of angles (100-180 degrees), causing infrared trend line 402 to overlap with blue trend line 400 across FIG. 5A. In FIG. 5B, ratio trend line 404 depicts the magnitude of the scattering intensity at 920 nm (shown by infrared trend line 402 in FIG. 5A) divided by the scattering intensity at 445 nm (shown by blue trend line 400 in FIG. 5A), from an angle of 100 degrees to an angle of 180 degrees. In FIGS. 5A-5B, the ice crystals have a median mass diameter (MMD) of 15 micrometers. For clouds containing ice crystals (as opposed to liquid water droplets), the MMD can give a representative ice crystal size within a cloud. The MMD is the ice crystal diameter below which, and above which, half of the cumulative mass in a cloud is contained. For example, a cloud having an MMD of 15 micrometers signifies that half of the mass in the cloud is contained in ice crystals which have a diameter of less than 15 micrometers, and the other half of the cloud's mass is contained in ice crystals which have a diameter greater than 15 micrometers.

Ice crystals do not exhibit the varying scattering intensity that liquid water droplets exhibit. As a result, the ratio of scattering intensities at two different wavelengths (such as 445 nanometers and 925 nanometers) will be fairly uniform across a range of angles. In FIG. 5A, blue trend line 400 and infrared trend line 402 generally remain constant from 100 degrees to approximately 130 degrees, increase from approximately 130 degrees to approximately 150 degrees, and remain constant from approximately 150 degrees to 180 degrees. In contrast to FIG. 4A, there are no scattering intensity peaks in blue trend line 400 or infrared trend line 402, and the maximum scattering intensity along both blue trend line 400 and infrared trend line 402 is approximately 0.00015. Ratio trend line 404 generally remains constant at a value of approximately 1 from 100 degrees to 180 degrees. Because ice crystals do not exhibit the same scattering behavior as liquid water droplets, FIG. 5B does not show variation in relative scattering intensity across the angle range in the way that FIG. 4B does.

Figure 6:
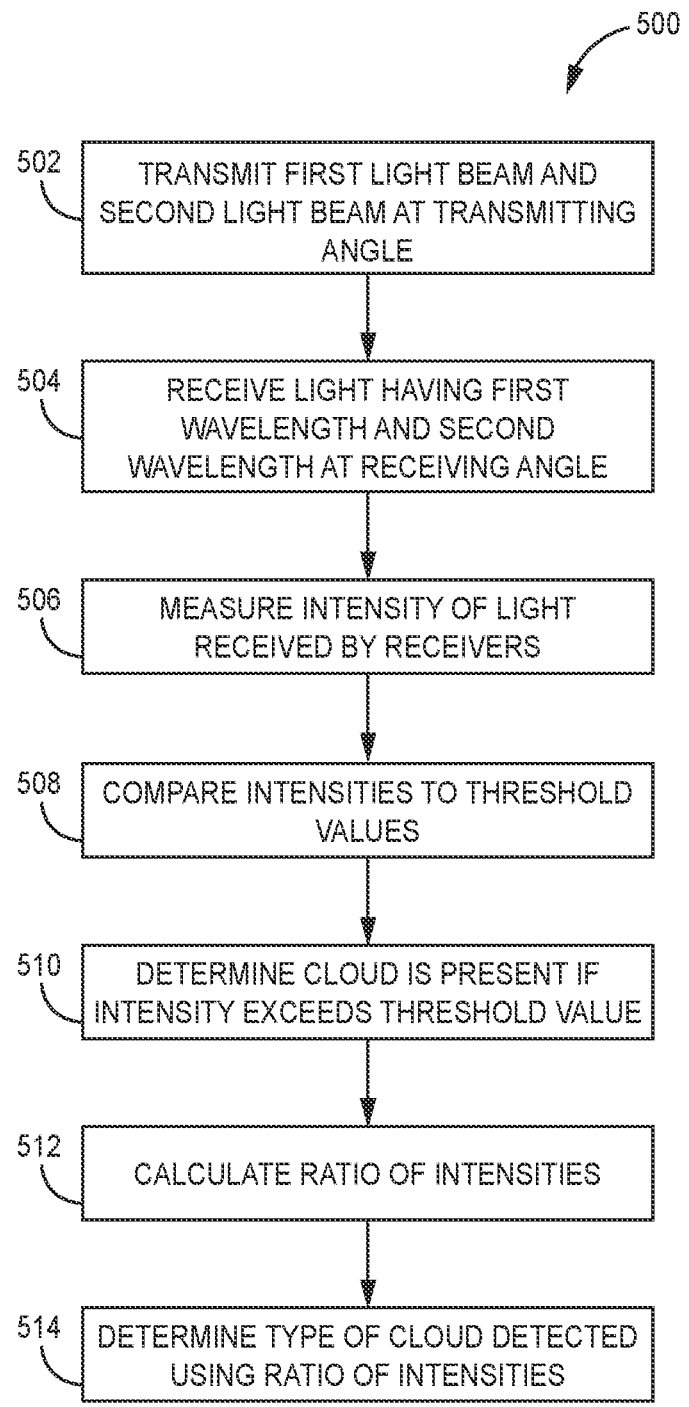
FIG. 6 depicts a method of operating an optical icing conditions sensor.

FIG. 6 depicts method 500 of operating an optical icing conditions sensor, such as OICS 10. Method 500 includes steps 502-514.

In step 502, a first light beam and a second light beam are each transmitted at a respective transmitting angle. This can be performed by, for example, a first transmitter and a second transmitter, such as first transmitter 16 and second transmitter 18 described above in reference to FIG. 1. The first light beam can have a first wavelength, which in some examples can be 445 nm. The second light beam can have a second wavelength, which in some examples can be 920 nm.

In step 504, light having the first wavelength and light having the second wavelength are each received at a respective receiving angle. This can be performed by, for example, a first receiver and a second receiver, such as first receiver 20 and second receiver 22 described above in reference to FIG. 1. The first receiver and the second receiver can receive light from the first transmitter and the second transmitter, background light from other sources (such as the sun), or a combination of both.

In step 506, the intensity of light received by each receiver in step 504 is measured. This can be performed by, for example, a controller such as controller 100 described above in reference to FIG. 2.

In step 508, the controller can compare each intensity measured in step 506 to a first threshold value and a second threshold value. The first threshold value is used in relation to the intensity of light received at the first wavelength in step 504. The second threshold value is used in relation to the intensity of light received at the second wavelength in step 504. In some embodiments, the first threshold value can be equal to the second threshold value. These threshold values allow the controller to estimate if at least a portion of the light emitted by the first transmitter or the second transmitter was received by the first receiver or the second receiver, respectively. The first threshold value and the second threshold value can each be selected based on the amount of light each transmitter emits. It should be understood that each threshold value should be selected with respect to an expected amount of ambient background light from other sources. Each of the first and second threshold values can be manually selected (i.e., by a user) or automatically set by the controller or another component of the aircraft.

In step 510, the controller can determine whether a cloud is present. The controller can make this determination by assessing whether each intensity measured in step 506 exceeds its respective threshold value. For example, if the controller determines that the intensity of light having the first wavelength exceeds the first threshold value, the controller can determine that a cloud is present. The selection of the threshold values described above in step 508 thereby allows the controller to determine that, if the threshold values are exceeded, light from either the first transmitter or the second transmitter has reflected from a cloud and traveled to the first receiver or the second receiver.

In step 512, the controller can calculate a ratio of intensities measured in step 506. The ratio of intensities is calculated by dividing the second intensity by the first intensity. The reflecting angle (such as reflecting angle $\theta$ described above in reference to FIG. 1) is selected such that the difference between the first intensity and the second intensity is largest at the reflecting angle, and therefore the ratio of intensities is approximately at a maximum value at the reflecting angle. The first wavelength and the second wavelength can be selected such that the second intensity is greater than the first intensity at the reflecting angle.

In step 514, the controller can use the ratio of intensities to determine the type of cloud detected in step 510. If the ratio of intensities is approximately 1, the cloud is determined to contain ice crystals. If the ratio of intensities is approximately 2 or greater, the cloud is determined to contain liquid water droplets. If the ratio of intensities is between approximately 1 and approximately 2, the cloud is determined to contain a mixture of ice crystals and liquid water droplets. It should be understood that if the first intensity is greater than the second intensity, the ratio will be the inverse of the ratios described here (i.e., a ratio of approximately 1 for ice crystal clouds, approximately 0.5 or less for liquid water clouds, and between approximately 0.5 and 1 for a mixture).

The controller can additionally make other determinations about the type of cloud present through inputs from other aircraft components. For example, the controller can receive air temperature data from a temperature sensor. If a water droplet cloud is detected, this data can allow the controller to determine whether the cloud contains supercooled liquid droplets. The controller can then communicate this determination to another aircraft component which can begin any required safety or de-icing mechanisms.

An optical sensor as described above provides numerous advantages. Discriminating between types of icing conditions allows the tailoring of safety procedures to the icing condition(s) detected. The OICS described above allows for the use of low-cost lasers and photodetectors. Additionally, these components do not require extremely sensitive electronics, and low-speed digital electronics can be used to receive and measure input signal data.

Discussion of Possible Embodiments

The following are non-exclusive descriptions of possible embodiments of the present invention.

An embodiment of a method of operating an optical icing conditions sensor for an aircraft includes transmitting, with a first transmitter, a first light beam having a first wavelength through an optical window of the aircraft at a first transmitting angle relative to the optical window. The first light beam illuminates a first illumination volume. A second transmitter transmits a second light beam having a second wavelength through the optical window of the aircraft at a second transmitting angle. The second light beam illuminates a second illumination volume. A first receiver receives light at a first receiving angle relative to the optical window. The first receiver is configured to receive light having the first wavelength over a first receiver field of view, and the first receiver field of view overlaps with the first illumination volume at a first predetermined distance. A second receiver receives light at a second receiving angle. The second receiver is configured to receive light having the second wavelength over a second receiver field of view, and the second receiver field of view overlaps with the second illumination volume at a second predetermined distance. A controller measures a first intensity of light received by the first receiver. The controller measures a second intensity of light received by the second receiver. The controller compares the first intensity to a first threshold value. The controller compares the second intensity to a second threshold value. The controller determines that a cloud is present if either the first intensity is greater than the first threshold value or the second intensity is greater than the second threshold value. The controller calculates a ratio of the first intensity to the second intensity if the controller determines that a cloud is present. The controller determines, using the ratio of the first intensity to the second intensity, whether the cloud contains liquid water droplets, ice crystals, or a mixture of liquid water droplets and ice crystals. A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

The method of the preceding paragraph can optionally include, additionally and/or alternatively, any one or more of the following features, configurations and/or additional components:

A method of operating an optical icing conditions sensor for an aircraft according to an exemplary embodiment of this disclosure, among other possible things includes transmitting, with a first transmitter, a first light beam having a first wavelength through an optical window of the aircraft at a first transmitting angle relative to the optical window. The first light beam illuminates a first illumination volume. A second transmitter transmits a second light beam having a second wavelength through the optical window of the aircraft at a second transmitting angle. The second light beam illuminates a second illumination volume. A first receiver receives light at a first receiving angle relative to the optical window. The first receiver is configured to receive light having the first wavelength over a first receiver field of view, and the first receiver field of view overlaps with the first illumination volume at a first predetermined distance. A second receiver receives light at a second receiving angle. The second receiver is configured to receive light having the second wavelength over a second receiver field of view, and the second receiver field of view overlaps with the second illumination volume at a second predetermined distance. A controller measures a first intensity of light received by the first receiver. The controller measures a second intensity of light received by the second receiver. The controller compares the first intensity to a first threshold value. The controller compares the second intensity to a second threshold value. The controller determines that a cloud is present if either the first intensity is greater than the first threshold value or the second intensity is greater than the second threshold value. The controller calculates a ratio of the first intensity to the second intensity if the controller determines that a cloud is present. The controller determines, using the ratio of the first intensity to the second intensity, whether the cloud contains liquid water droplets, ice crystals, or a mixture of liquid water droplets and ice crystals. A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

A further embodiment of the foregoing method, further comprising communicating to a component of the aircraft, with the controller, whether the cloud contains liquid water droplets, ice crystals, or a mixture of liquid water droplets and ice crystals.

A further embodiment of any of the foregoing methods, wherein the second scattering intensity is greater than the first scattering intensity.

A further embodiment of any of the foregoing methods, wherein a ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals.

A further embodiment of any of the foregoing methods, wherein the first wavelength is between 400 nanometers and 500 nanometers, and the second wavelength is between 800 and 1000 nanometers.

A further embodiment of any of the foregoing methods, wherein the first wavelength is 445 nanometers and the second wavelength is 920 nanometers.

A further embodiment of any of the foregoing methods, wherein the first transmitting angle is approximately equal to the first receiving angle and the second transmitting angle is approximately equal to the second receiving angle.

A further embodiment of any of the foregoing methods, wherein the first reflecting angle is approximately equal to the second reflecting angle.

A further embodiment of any of the foregoing methods, wherein the first reflecting angle is approximately 136 degrees.

A further embodiment of any of the foregoing methods, wherein the second reflecting angle is approximately 136 degrees.

A further embodiment of any of the foregoing methods, wherein the first predetermined distance is between 2.5 inches and 12 inches, and the second predetermined distance is approximately equal to the first predetermined distance.

A further embodiment of any of the foregoing methods, further comprising communicating to a component of the aircraft, with the controller, whether the cloud contains liquid water droplets, ice crystals, or a mixture of liquid water droplets and ice crystals. The first scattering intensity is greater than the second scattering intensity. A ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals. The first wavelength is 445 nanometers and the second wavelength is 920 nanometers. The first reflecting angle is approximately equal to the second reflecting angle. The first reflecting angle is approximately 136 degrees. The first predetermined distance is between 2.5 inches and 12 inches. The second predetermined distance is approximately equal to the first predetermined distance.

An embodiment of an optical icing conditions sensor for an aircraft includes a first transmitter, a second transmitter, a first receiver, a second receiver, and a controller. The first transmitter is configured to transmit a first light beam having a first wavelength through an optical window at a first transmitting angle relative to the optical window. The second transmitter is located adjacent to the first transmitter and is configured to transmit a second light beam having a second wavelength through the optical window at a second transmitting angle. The first receiver is configured to receive light having the first wavelength at a first receiving angle relative to the optical window. The second receiver is located adjacent to the first receiver and is configured to receive light having the second wavelength at a second receiving angle. The controller is configured to measure a first intensity of light received by the first receiver. The controller is further configured to measure a second intensity of light received by the second receiver. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals. A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

The optical icing conditions sensor of the preceding paragraph can optionally include, additionally and/or alternatively, any one or more of the following features, configurations and/or additional components:

An icing conditions optical icing conditions sensor for an aircraft according to an exemplary embodiment of this disclosure, among other possible things includes a first transmitter, a second transmitter, a first receiver, a second receiver, and a controller. The first transmitter is configured to transmit a first light beam having a first wavelength through an optical window at a first transmitting angle relative to the optical window. The second transmitter is located adjacent to the first transmitter and is configured to transmit a second light beam having a second wavelength through the optical window at a second transmitting angle. The first receiver is configured to receive light having the first wavelength at a first receiving angle relative to the optical window. The second receiver is located adjacent to the first receiver and is configured to receive light having the second wavelength at a second receiving angle. The controller is configured to measure a first intensity of light received by the first receiver. The controller is further configured to measure a second intensity of light received by the second receiver. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals.

A first reflecting angle is defined by the first light beam transmitted at the first transmitting angle and light received by the first receiver at the first receiving angle. A second reflecting angle is defined by the second light beam transmitted at the second transmitting angle and light received by the second receiver at the second receiving angle. The first light beam has a first scattering intensity at the first reflecting angle. The second light beam has a second scattering intensity at the second reflecting angle.

A further embodiment of the foregoing optical icing conditions sensor, wherein the controller is further configured to communicate to a component of the aircraft, using the ratio of the first intensity to the second intensity, whether the cloud contains liquid water droplets, ice crystals, or a mixture of liquid water droplets and ice crystals.

A further embodiment of any of the foregoing optical icing conditions sensors, wherein the first wavelength is between 400 nanometers and 500 nanometers, and the second wavelength is between 800 and 1000 nanometers.

A further embodiment of any of the foregoing optical icing conditions sensors, wherein the first wavelength is 445 nanometers and the second wavelength is 920 nanometers.

A further embodiment of any of the foregoing optical icing conditions sensors, wherein the controller is further configured to communicate to a component of the aircraft, using the ratio of the first intensity to the second intensity, whether the cloud contains liquid water droplets, ice crystals, or a mixture of liquid water droplets and ice crystals. The first scattering intensity is greater than the second scattering intensity at the first reflecting angle. A ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals. The first wavelength is 445 nanometers and the second wavelength is 920 nanometers. The first reflecting angle is approximately equal to the second reflecting angle. The first reflecting angle is approximately 136 degrees.

An embodiment of a controller for an optical icing conditions sensor of an aircraft includes at least one processor, at least one memory unit, and at least one communication unit. The controller is configured to measure a first intensity of light received by a first receiver of the optical icing conditions sensor. The controller is further configured to measure a second intensity of light received by a second receiver of the optical icing conditions sensor. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals.

The controller of the preceding paragraph can optionally include, additionally and/or alternatively, any one or more of the following features, configurations and/or additional components:

A controller for an optical icing conditions sensor of an aircraft according to an exemplary embodiment of this disclosure, among other possible things includes at least one processor, at least one memory unit, and at least one communication unit. The controller is configured to measure a first intensity of light received by a first receiver of the optical icing conditions sensor. The controller is further configured to measure a second intensity of light received by a second receiver of the optical icing conditions sensor. The controller is further configured to compare the first intensity to a first threshold value. The controller is further configured to compare the second intensity to a second threshold value. The controller is further configured to determine that a cloud is present if either the first intensity is greater than the first threshold value or the second intensity is greater than the second threshold value. The controller is further configured to calculate a ratio of the first intensity to the second intensity if a cloud is present. The controller is further configured to determine, using the ratio of the first intensity to the second intensity, whether the cloud contains liquid water droplets, ice crystals, or a mixture of liquid water droplets and ice crystals.

A further embodiment of the foregoing controller, wherein the controller is further configured to communicate to a component of the aircraft, using the ratio of the first intensity to the second intensity, whether the cloud contains liquid water droplets, ice crystals, or a mixture of liquid water droplets and ice crystals.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating an optical icing conditions sensor for an aircraft, the method comprising:
   transmitting, with a first transmitter, a first light beam having a first wavelength through an optical window of the aircraft at a first transmitting angle relative to the optical window, wherein the first light beam illuminates a first illumination volume;
   transmitting, with a second transmitter, a second light beam having a second wavelength through the optical window of the aircraft at a second transmitting angle, wherein the second light beam illuminates a second illumination volume;
   receiving, with a first receiver, light at a first receiving angle relative to the optical window, wherein the first receiver is configured to receive light having the first wavelength over a first receiver field of view, wherein the first receiver field of view overlaps with the first illumination volume at a first predetermined distance;
   receiving, with a second receiver, light at a second receiving angle, wherein the second receiver is configured to receive light having the second wavelength over a second receiver field of view, wherein the second receiver field of view overlaps with the second illumination volume at a second predetermined distance;
   measuring, with a controller, a first intensity of light received by the first receiver;
   measuring, with the controller, a second intensity of light received by the second receiver;
   comparing, with the controller, the first intensity to a first threshold value;
   comparing, with the controller, the second intensity to a second threshold value;
   determining, with the controller, that a cloud is present if either the first intensity is greater than the first threshold value or the second intensity is greater than the second threshold value;
   calculating, with the controller, a ratio of the first intensity to the second intensity if the controller determines that a cloud is present; and
   determining, with the controller, using the ratio of the first intensity to the second intensity, whether the cloud contains liquid water droplets, ice crystals, or a mixture of liquid water droplets and ice crystals;
   wherein a first reflecting angle is defined by the first light beam transmitted at the first transmitting angle and light received by the first receiver at the first receiving angle, a second reflecting angle is defined by the second light beam transmitted at the second transmitting angle and light received by the second receiver at the second receiving angle, the first light beam has a first scattering intensity at the first reflecting angle, and the second light beam has a second scattering intensity at the second reflecting angle.

2. The method of claim 1, further comprising communicating to a component of the aircraft, with the controller, whether the cloud contains liquid water droplets, ice crystals, or a mixture of liquid water droplets and ice crystals.

3. The method of claim 1, wherein the second scattering intensity is greater than the first scattering intensity.

4. The method of claim 3, wherein a ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals.

5. The method of claim 1, wherein the first wavelength is between 400 nanometers and 500 nanometers, and the second wavelength is between 800 and 1000 nanometers.

6. The method of claim 5, wherein the first wavelength is 445 nanometers and the second wavelength is 920 nanometers.

7. The method of claim 1, wherein the first transmitting angle is approximately equal to the first receiving angle and the second transmitting angle is approximately equal to the second receiving angle.

8. The method of claim 1, wherein the first reflecting angle is approximately equal to the second reflecting angle.

9. The method of claim 1, wherein the first reflecting angle is approximately 136 degrees.

10. The method of claim 1, wherein the second reflecting angle is approximately 136 degrees.

11. The method of claim 1, wherein the first predetermined distance is between 2.5 inches and 12 inches, and the second predetermined distance is approximately equal to the first predetermined distance.

12. The method of claim 1, further comprising:
communicating to a component of the aircraft, with the controller, whether the cloud contains liquid water droplets, ice crystals, or a mixture of liquid water droplets and ice crystals;
wherein:
the first scattering intensity is greater than the second scattering intensity, wherein a ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals;
the first wavelength is 445 nanometers and the second wavelength is 920 nanometers;
the first reflecting angle is approximately equal to the second reflecting angle;
the first reflecting angle is approximately 136 degrees;
the first predetermined distance is between 2.5 inches and 12 inches; and
the second predetermined distance is approximately equal to the first predetermined distance.

13. An optical icing conditions sensor for an aircraft, the optical icing conditions sensor comprising:
a first transmitter configured to transmit a first light beam having a first wavelength through an optical window at a first transmitting angle relative to the optical window;
a second transmitter located adjacent to the first transmitter, wherein the second transmitter is configured to transmit a second light beam having a second wavelength through the optical window at a second transmitting angle;
a first receiver configured to receive light having the first wavelength at a first receiving angle relative to the optical window;
a second receiver located adjacent to the first receiver, wherein the second receiver is configured to receive light having the second wavelength at a second receiving angle; and
a controller, wherein the controller is configured to:
measure a first intensity of light received by the first receiver;
measure a second intensity of light received by the second receiver;
compare the first intensity to a first threshold value;
compare the second intensity to a second threshold value;
determine that a cloud is present if either the first intensity is greater than the first threshold value or the second intensity is greater than the second threshold value;
calculate a ratio of the first intensity to the second intensity if a cloud is present; and
determine, using the ratio of the first intensity to the second intensity, whether the cloud contains liquid water droplets, ice crystals, or a mixture of liquid water droplets and ice crystals;
wherein a first reflecting angle is defined by the first light beam transmitted at the first transmitting angle and light received by the first receiver at the first receiving angle, a second reflecting angle is defined by the second light beam transmitted at the second transmitting angle and light received by the second receiver at the second receiving angle, the first light beam has a first scattering intensity at the first reflecting angle, and the second light beam has a second scattering intensity at the second reflecting angle.

14. The optical icing conditions sensor of claim 13, wherein the controller is further configured to communicate to a component of the aircraft, using the ratio of the first intensity to the second intensity, whether the cloud contains liquid water droplets, ice crystals, or a mixture of liquid water droplets and ice crystals.

15. The optical icing conditions sensor of claim 13, wherein the first wavelength is between 400 nanometers and 500 nanometers, and the second wavelength is between 800 and 1000 nanometers.

16. The optical icing conditions sensor of claim 15, wherein the first wavelength is 445 nanometers and the second wavelength is 920 nanometers.

17. The optical icing conditions sensor of claim 13, wherein:
the controller is further configured to communicate to a component of the aircraft, using the ratio of the first intensity to the second intensity, whether the cloud contains liquid water droplets, ice crystals, or a mixture of liquid water droplets and ice crystals;
the first scattering intensity is greater than the second scattering intensity at the first reflecting angle, wherein a ratio of approximately 1 indicates that the cloud contains ice crystals, a ratio of approximately 2 or greater indicates that the cloud contains liquid water droplets, and a ratio of between approximately 1 and approximately 2 indicates that the cloud contains a mixture of liquid water droplets and ice crystals;
the first wavelength is 445 nanometers and the second wavelength is 920 nanometers;
the first reflecting angle is approximately equal to the second reflecting angle; and
the first reflecting angle is approximately 136 degrees.

18. A controller for an optical icing conditions sensor of an aircraft, the controller comprising:
at least one processor;
at least one memory unit; and
at least one communication unit;
wherein the controller is configured to:
measure a first intensity of light received by a first receiver of the optical icing conditions sensor;
measure a second intensity of light received by a second receiver of the optical icing conditions sensor;
compare the first intensity to a first threshold value;
compare the second intensity to a second threshold value;
determine that a cloud is present if either the first intensity is greater than the first threshold value or the second intensity is greater than the second threshold value;
calculate a ratio of the first intensity to the second intensity if a cloud is present; and
determine, using the ratio of the first intensity to the second intensity, whether the cloud contains liquid water droplets, ice crystals, or a mixture of liquid water droplets and ice crystals.

19. The controller of claim 18, wherein the controller is further configured to communicate to a component of the aircraft, using the ratio of the first intensity to the second intensity, whether the cloud contains liquid water droplets, ice crystals, or a mixture of liquid water droplets and ice crystals.

* * * * *